United States Patent
Dennis et al.

(10) Patent No.: US 9,973,572 B2
(45) Date of Patent: May 15, 2018

(54) SERVER LOAD MANAGEMENT FOR DATA MIGRATION

(71) Applicant: SkyKick, Inc., Seattle, WA (US)

(72) Inventors: John Dennis, Seattle, WA (US); Evan Richman, Seattle, WA (US); Todd Schwartz, Seattle, WA (US); Bradley Younge, Denver, CO (US); Manoj Ganesh Panse, Seattle, WA (US)

(73) Assignee: SKYKICK, INC., Seattle, WA (US)

( * ) Notice: Subject to any disclaimer, the term of this patent is extended or adjusted under 35 U.S.C. 154(b) by 217 days.

(21) Appl. No.: 15/099,534

(22) Filed: Apr. 14, 2016

(65) Prior Publication Data

US 2016/0308726 A1 Oct. 20, 2016

Related U.S. Application Data

(60) Provisional application No. 62/147,525, filed on Apr. 14, 2015.

(51) Int. Cl.
*H04L 29/08* (2006.01)
*H04L 12/24* (2006.01)
(Continued)

(52) U.S. Cl.
CPC ........ *H04L 67/1002* (2013.01); *G06F 3/0647* (2013.01); *G06F 3/0653* (2013.01);
(Continued)

(58) Field of Classification Search
CPC .... H04L 29/12; H04L 61/103; H04L 61/2015
See application file for complete search history.

(56) References Cited

U.S. PATENT DOCUMENTS

| 6,880,089 B1 | 4/2005 | Bommareddy et al. |
| 8,396,895 B2 | 3/2013 | Miloushev et al. |

(Continued)

FOREIGN PATENT DOCUMENTS

| EP | 2701064 A1 | 2/2014 |
| WO | 2013/072959 A1 | 3/2013 |
| WO | 2014/058944 A1 | 4/2014 |

OTHER PUBLICATIONS

"Monitoring Using Oracle Grid Control" [online], [retrieved on Jul. 7, 2016]. Retrieved from the internet, URL http://docs.oracle.com/cd/B28359_01/server.111/b28282/monitor.htm.

*Primary Examiner* — Arvin Eskandarnia
(74) *Attorney, Agent, or Firm* — Kilpatrick Townsend & Stockton LLP

(57) ABSTRACT

A system and method for controlling a migration of data items in a data directory from a source system to a destination system by setting one or more target properties for implementing the migration are disclosed. A migration controller can be employed to obtain statistical information regarding the migration. The statistical information can then be used to compute the one or more target properties. For example, a target number of network connections for achieving an optimal total throughput and concurrency can be computed based on an average throughput per network connection. The target number of network connections may be determined by a migration monitor, which may set the determined target number of network connections as a policy to be enforced by the migration controller.

10 Claims, 8 Drawing Sheets

(51) Int. Cl.
*H04L 12/26* (2006.01)
*G06F 3/06* (2006.01)
*H04L 29/06* (2006.01)

(52) U.S. Cl.
CPC ...... *H04L 41/0896* (2013.01); *H04L 41/5009* (2013.01); *H04L 41/5025* (2013.01); *H04L 43/0888* (2013.01); *H04L 67/148* (2013.01); *H04L 69/14* (2013.01)

(56) References Cited

U.S. PATENT DOCUMENTS

| | | | |
|---|---|---|---|
| 8,473,566 B1 | 6/2013 | Cardente et al. | |
| 8,566,483 B1 | 10/2013 | Chen et al. | |
| 9,189,168 B2 | 11/2015 | Nemoto et al. | |
| 9,207,873 B2 | 12/2015 | Nelson et al. | |
| 2001/0002469 A1* | 5/2001 | Bates | G06F 17/30699 |
| 2003/0088671 A1 | 5/2003 | Klinker et al. | |
| 2005/0210110 A1* | 9/2005 | Li | H04L 51/38 |
| | | | 709/206 |
| 2006/0040678 A1* | 2/2006 | Kwon | H04W 4/14 |
| | | | 455/456.3 |
| 2006/0068812 A1* | 3/2006 | Carro | H04M 1/72566 |
| | | | 455/456.3 |
| 2007/0032225 A1* | 2/2007 | Konicek | H04M 1/72513 |
| | | | 455/417 |
| 2007/0117574 A1* | 5/2007 | Watanabe | H04M 1/72536 |
| | | | 455/456.1 |
| 2007/0190989 A1* | 8/2007 | Kikuta | H04W 4/00 |
| | | | 455/414.1 |
| 2007/0232334 A1* | 10/2007 | Nagashima | H04M 1/72552 |
| | | | 455/466 |
| 2008/0014965 A1* | 1/2008 | Dennison | H04B 7/18541 |
| | | | 455/456.1 |
| 2008/0036778 A1* | 2/2008 | Sheha | G01C 21/3664 |
| | | | 345/502 |
| 2008/0225779 A1* | 9/2008 | Bragiel | G01S 5/0252 |
| | | | 370/328 |
| 2008/0233935 A1* | 9/2008 | Garg | H04W 4/001 |
| | | | 455/417 |
| 2008/0248820 A1* | 10/2008 | Lohtia | H04W 4/14 |
| | | | 455/466 |
| 2009/0177484 A1* | 7/2009 | Davis | G06Q 30/02 |
| | | | 705/346 |
| 2009/0177745 A1* | 7/2009 | Davis | G06Q 10/107 |
| | | | 709/204 |
| 2012/0278512 A1 | 11/2012 | Alatorre et al. | |

\* cited by examiner

SERVER LOAD MANAGEMENT FOR DATA MIGRATION

CROSS-REFERENCES TO RELATED APPLICATIONS

This application claims benefit under 35 U.S.C. § 119(e), of U.S. Patent Application No. 62/147,525 filed Apr. 14, 2015 for "SERVER LOAD MANAGEMENT FOR DATA MIGRATION" The entire disclosure of the above mentioned application is incorporated by reference for all purposes.

FIELD

The present disclosure relates generally to managing load on a server during data migration.

BACKGROUND

Data migration can add more traffic to the source network than what it might normally experience, which may strain the source servers (e.g. by having to retrieve large amounts of archived data, such as old email messages). This strain can inhibit the flow of data across the source network, or cause one or more of the source servers to crash. Depending on the network lag or downtime that is caused by the migration, the effect on end users may range from a slight, to complete loss, of productivity until network conditions return to normal. For a business, the resulting reduction or loss of customer engagement and revenue can be devastating. And for those tasked with managing the migration, many hours may be spent diagnosing and solving problems. Therefore, the prevention and/or swift mitigation of these data migration-induced problems is of utmost importance.

Contributing factors to the above-described problems may be transient or non-transient. Transient issues are temporary ones that may be solved if certain environmental aspects of the source network are modified, e.g., by decreasing the number of concurrent migrations. Examples of transient issues include the increased loads experienced by the source server when data is migrated from it, and when end users make server requests through normal daily operation.

Non-transient limitations are rooted in the design and architecture of the source network itself and are thus more difficult to avoid through simple changes in the source network's environment. Examples of non-transient limitations include the bandwidth and load limitations of the source server.

One common solution to load-related problems stemming from transient and non-transient issues present during data migrations is to perform load balancing, which distributes workloads across multiple computing resources. Load balancing aims to maximize data throughput, minimize response times, optimize resource use, and avoid overload of any one of the resources.

Current methods of load balancing during a migration, however, are reactive, manual and are not scalable. One such approach is, when an issue arises, a server that controls the migration pings a database primarily used to track data migration orders and user account information (hereinafter referred to as an "order database"). The order database in turn sends alerts to one or more people tasked with managing the migration (hereinafter referred to as a "partner") via a web-based or local application. Upon notification, the partner then attempts to classify the problem and solve it based on their knowledge and experience with the source system in question. These methods used in classifying and solving the problem lack reliability, however, because it can be difficult to know why a particular solution worked or did not work. The lack of visibility into the source system's health and capabilities also makes it difficult to determine what its baseline or "normal" operating conditions are, and therefore what conditions should be aimed for when adjusting loads to mitigate transient issues. And, there is a great variety in server and network configurations, as well as error messages, which make it particularly difficult to classify the root cause of problems that occur and then apply the correct solution.

Therefore, it is desirable to provide systems and methods that address these and other problems.

BRIEF SUMMARY

Embodiments can control a migration of data items in a data directory from a source system to a destination system by setting one or more target properties for implementing the migration. A migration controller can be employed to obtain statistical information regarding the migration. For example, the statistical information can include network connection information indicating a number of network connections currently between the source and destination system to facilitate the migration, CPU usage information regarding the source and/or the destination systems, memory usage information regarding the source and/or the destination system, resource usage information, thread information and/or any other performance information regarding the source system and/or the destination system. The statistical information can then be used to compute the one or more target properties. For example, a target number of network connections for achieving an optimal total throughput and concurrency can be computed based on an average throughput per network connection. The target number of network connections may be determined by a migration monitor, which may set the determined target number of network connections as a policy to be enforced by the migration controller.

Other embodiments are directed to systems and computer readable media associated with methods described herein.

A better understanding of the nature and advantages of embodiments of the present invention may be gained with reference to the following detailed description and the accompanying drawings.

DETAILED DESCRIPTION

Embodiments can provide load management to address load-related issues that may occur during a data migration. Some embodiments accomplish this by gathering statistics across various servers in a data migration environment to determine optimal loading conditions for the servers.

Some embodiments can dynamically determine non-transient limitations of a source server, and therefore its baseline operating conditions, so that an optimal throughput may be determined and applied for a data migration. Some embodiments described herein may also match error messages against a library to categorize errors and determine and apply appropriate corrective actions.

I. Architecture

Figure 1:
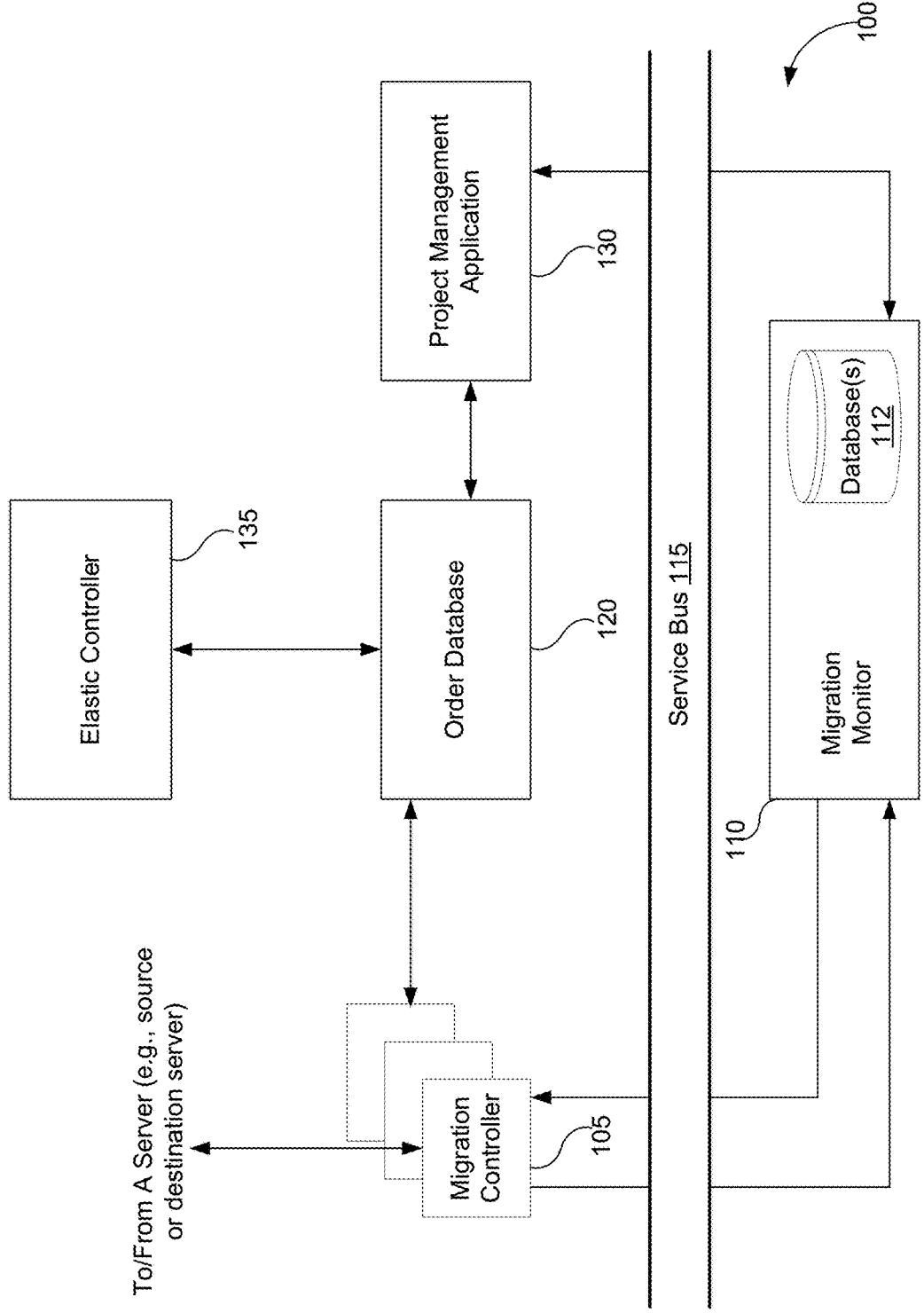
FIG. 1 is illustrates an example of a system for controlling a migration between a source and a destination system in accordance with the disclosure.

In various embodiments, a system is employed for controlling a migration between a source and a destination system. FIG. 1 illustrates an example of such a system, i.e. system 100 as shown. System 100 can be configured to control a migration of data from a source server (not shown) to a destination server (not shown). In this example, system 100 comprises a migration monitor 110, one or more of a migration controller 105, an order database 120, a project management application 130, and an elastic controller 135. It should be understood the arrangement and the components of system 100 shown in FIG. 1 are not intended to be limiting. In some embodiments, the system configured to manage server load in a data migration in accordance with the disclosure can include more or less components than those shown in FIG. 1, and/or can be arranged differently from the arrangement shown in FIG. 1.

A. Migration Controller

The migration controller 105 can be configured to control a source system and/or destination system involved in a data migration. In some embodiments, migration controller 105 can be reserved by the elastic controller 125, based on a customer order submitted through a project management application 130 and relayed through the order database 120. The migration controller 105 can control the migration according to a configuration made in the project management application 130. Any number of connections could be created between the migration controllers 105 and the source and destination servers.

One or more of the migration controller 105 can be allocated to control the migration depending on a customer order. In some embodiments, migration controller 105 can correspond to a virtual machine. In one embodiment, there can be one migration controller per data directory—i.e., a collection of data items logically grouped, e.g., a mailbox. For example, there could be 100 mailboxes, where 10 mailboxes are migrated at a time, and thus 10 migration controllers could be allocated. An order (i.e., set of mailboxes to be migrated) could use multiple servers, each potentially with multiple migration controllers 105. Thus, a grouping of mailboxes can map to a single server. Database(s) 112 can be used to track which migration controllers correspond to a particular order in which computer servers the migration controllers are running on. In some implementations, a single migration controller 105 can be allocated to control multiple source and/or destination systems. Once allocated to control the migration between source and destination systems, the migration controller 105 can be configured to register itself with migration monitor 110.

The migration controller 105 can be configured to communicate with a source and/or a destination system as a proxy and mediate the data flow between them. Connections may be established between the migration controller 105 and the source system, as well as between the migration controller 105 and the destination system. Any number of these connections can be created.

Migration controller 105 can be configured to send instructions to the source system and/or the destination system. Through the instructions, the migration controller 105 can instruct the source and/or destination system to perform certain operations and/or set certain limits on one or more resources that can be provided by the source system and/or the destination system. For example, as illustration, the migration controller 105 can be configured to send instructions to the source system to limit the number of network connections that can be established by the source system. As will be described in detail below, the migration controller 105 can set a target number of network connections determined based on average throughput per network connection and send an instruction to the source system to limit the number of network connections that can be established by the source system within the target number of network connections. As another example, the migration controller 105 can be configured to send an instruction to request the source system to send certain amount of data to the migration controller 105. For instance, the migration controller 105 can send a request to create a network connection (e.g. a TCP connection) between the source system and the migration controller 105 to transmit one or more files (e.g., e-mails, PDF documents, etc.).

The migration controller 105 can be configured to measure one or more properties of the migration between the source system and destination system. For example, the migration controller 105 can send a request to obtain a number of network connections currently being established between the source system and destination system for facilitating the migration. As another example, the migration controller 105 can be configured to monitor data flow between the source system and destination system and determine a communication speed between the two. Still as another example, the migration controller 105 can be configured to gather various performance statistics from the source system and/or the destination system. For instance, the migration controller 105 can be configured to poll load information, CPU usage information, memory usage information, resource usage information, and/or any other information.

Once registered with the migration monitor 110, the migration controller 105 can be configured to communicate with migration monitor 110 via the service bus 115. However, this is not intended to be limiting. In some other examples, the migration controller 105 can communicate with the migration monitor 110 via a wired and/or a wireless network. In any case, after being registered with the migration monitor 110, the migration controller 105 can be configured to receive one or more policies from the migration controller 105 and enforce these policies. As will be described below, the policies received from the migration monitor 110 can specify certain target properties and/or threshold values to be maintained during the migration between the source system and the destination system. For example, the policies can specify a target number of network connections that can be established by the source system and the migration controller 105 can be configured to enforce this. For instance, the migration controller 105 can periodically obtain network connection information from the source system and determine whether the number of network connections between the source system and the destination system has exceed the target number of network connections. In the case when it is determined that number of network connections between the source system and the destination system, the migration controller 105 can send one or more instructions to the source system to reduce the number of network connections established between the source system and the destination system.

In some implementations, the migration controller 105 can be configured to send various statistical information regarding the migration controlled by the migration controller 105. The migration controller 105 can be configured to send messages to the migration monitor 110 when the policies set by the migration monitor 110 is breached by the migration. In some implementations, the migration monitor 110 can send instructions to the migration controller 105 to have the migration controller 105 address the breach of the policies. For example, if the source system has established more than the target number of network connections with the destination system, the migration monitor 110 can send instructions to the migration controller 105 to have the migration controller 105 reduce the number of network connections to the target number of network connections; or set a new target number of network connections higher than the previous one. However, this is not intended to be limiting, in some implementations, the migration controller 105 can be configured to address the breach of the policies by automatically generate those instructions on its own.

B. Migration Monitor

The migration monitor 110 can be configured to determine one or more target properties of the migration controlled by the migration controller 105. As described above, the migration controller 105 can register itself with the migration monitor 110. After the migration controller 105 having been registered, the migration monitor 110 can be configured to obtain certain statistics regarding the migration controlled by the migration controller 105 for determining the one or more target properties. For example, as described above, migration monitor 110 can be configured to use the statistics information to make determinations about one or more target properties for the migration controlled by the migration controller 105. The migration monitor 110 can be configured to then send the determined target properties as policies to the migration controller 105 to have the migration controller 105 enforce those policies for the migration. For example, the policies may define what is needed to maintain a productive and efficient migration—for example minimum and maximum data throughput rates may be defined. In certain implementations, the migration monitor 110 can receive messages from the migration controller 105 indicating one or more of the polices have been breached by the migration between the source and the destination systems; and generate instructions to the migration controller 105 to have the migration controller 105 address the breach.

In some implementations, the migration monitor 110 can be configured to receive and/or make queries for a status update of the current state of the migration controller 105 through a service bus 115 (the status update hereinafter referred to as the "heartbeat" of the migration controller 105). Migration controller 105 can obtain the data for one connection, and migration monitor 110 can analyze the data. Other migration controllers can obtain data for other connections. Such data may include, but is not limited to, response times (e.g. how long it takes for each individual file in a migration to migrate from the source system to the migration controller 105), and error state (e.g. whether the connection to the source server is severed for some reason, as may occur when losing authentication). The heartbeat may be a signal linked to a non-application-specific event, e.g. it is broadcast and/or received at certain intervals like once every 2 minutes.

In some implementations, the migration monitor 110 can be configured to determine throughput for individual network connections between the source and destination systems. In those implementations, for determining the throughput for a given network connection, the migration monitor 110 can send requests to the source or destination system via the migration controller 105. The requests can have source or destination system send to the other system an amount of data through the given network connection. The migration monitor 110 can then obtain response time (RT), which may be used to determine baseline conditions for the source and/or destination systems. In some implementations, response times may be measured by the migration controller 105, by starting a timer when the requested data is sent to the source or destination system, and stopping the timer when the requested data is received at the destination or source system. For example, the migration monitor 110 can request the source system to send 10M bytes to the destination system through the given network connections and then obtain the response time for the 10M bytes to be received at the destination system. That is, the response time, in that example, is the time period between when the 10M bytes are requested to be sent by the source system and when the 10M bytes are completely received by the destination system. However, it should be understood, in some other examples, the response time can be defined differently. For example, the response time can be defined only as a time period that takes the source system to completely send the 10M bytes through the network connections.

In any case, once the response time is obtained via the migration controller 105, the migration monitor 110 can be configured to compute the throughput for the given network connections by dividing the curve amount of the data sent through the given network connection by the response time. For example, as illustration, if the response time obtained by the migration monitor 110 is 4 seconds, then the throughput of the network connection is 10 MB/4 seconds=2.5 MB/s.

In some implementations, the migration monitor 110 can be configured to compute the throughput of the given network connection by sending multiple requests to the source or destination systems to have them send to the other system an amount of data for each request. For example, the migration monitor 110 can send out 10 requests to the source system to have the source system send 1 MB data to the destination system through the given network connection on each request. The migration monitor 110 can then obtain total response time all of the requests to compute the throughput of the given network connections. For example, if the total response time is 20 seconds, the throughput of the given network connection is (10×1 MB)/20 seconds=0.5 MB.

The migration monitor 110 can be configured to compute an average throughput per network connection based on the individual throughputs of all of the network connections between the source and destination systems. For example, the migration monitor 110 can compute a throughput for each of the network connections between the source and destination systems, and sum up all of the throughputs to obtain a total throughput of all of the network connections. The average throughput per network connection can then computed by dividing the total throughput for all of the network connections by the number of the network connections. For example, there may be four network connections between the source and destination systems with the first network connection having 1 MB/s throughput, the second network connection having 0.5 MB/s throughput, the third network connection have 0.8 MB/s and the fourth network connection having 2.5 MB/S. The total throughput for all the network connections can then be computed by the migration monitor 110 to be 1+0.5+0.8+2.5=4.8 MB/S. The average throughput per network connection can then be computed by the migration monitor 110 to be 4.8/4=1.2 MB/s.

In some implementations, the migration monitor 110 can be configured to identify a target number of network connections that may be implemented for the migration between the source and destination systems. In those implementations, the migration monitor 110 can be configured to determine a set of average throughputs per network connection between the source and destination systems. Each of the average throughput in the set can correspond to a unique number of network connections. For example, the migration monitor 110 can be configured to determine an average throughput per network connection when there are 4 network connections established between the source and destination systems; to determine another average throughput per network connection when there 5 network connections established between the source and destination system; to determine yet another average throughput per network connection when there 6 network connections established between the source and destination system; and so on. The migration monitor 110 can the identify the target number of the network connections, which may represent an optimal number of network connections for achieving good throughput and parallelism, by determining a function of average throughput per network connection with respect to a quantity of network connections. In some implementations, the identification of the target number of network connections can be based on a change in the number of network connections.

In some implementations, error state information (e.g. whether an error is recoverable or not recoverable) can be used to initiate a process of determining whether existing errors may be resolved by reducing concurrency (defined herein as the number of simultaneous connections between the source server and the migration controller 105), as described in more detail below.

The one or more database(s) 112 of the migration monitor 110 in some embodiments may serve multiple functions. For example, the database(s) 112 may hold a list of registered customers so that associations may be made between data to be migrated (e.g. a grouping of mailboxes) and the migration controller(s) reserved for them. Database(s) 112 may be used to compute baseline conditions for the source system using certain algorithms described in more detail below, and may generate policies and commands based on data received from the migration controller 105.

The migration monitor 110 can be configured to generate one or more instructions after a message is received from the migration controller 105 indicating one or more policies have been breached by the migration between the source and destination systems. The migration monitor 110 can send the instructions to the migration controller 105 via the service bus 115, e.g. "reduce concurrency from ten connections to five connections." Such instructions may include commands specific to a particular migration controller 105 or may be the broadcast of one or more commands to multiple migration controllers 105, corresponding to one or more data migrations. The migration monitor 110 may send policy definitions to migration controllers 105 in the same fashion.

C. Service Bus

In some embodiments, a service bus 115 receives the heartbeat of the migration controller 105. The service bus 115 may act as an inter-server communication/broadcast channel. In some embodiments, the service bus 115 may be a server that forwards a set of commands, e.g. adjusting number of connections, shut down entirely, etc. to achieve maximum efficient throughput. In some embodiments, the communication broadcast by the service bus 115 may be asynchronous. Service bus 115 can queue communications to be sent to various devices in system 100. In certain aspects, the service bus can be a special type of external queue system, which stores and earmarks messages for specific channels. Certain machines (virtual or non-virtual) may be designated to read messages from specific channels. For example, either the first machine on a channel may read a message, or all machines on the channel can read the message. In times of high load, the number of messages on the service bus can increase and extra machines may be spun up in response to handle the load.

In some embodiments, any process, routine, or "image" (e.g. migration controller, migration monitor, project management application, etc.) can connect to the service bus 115 and receive the data it broadcasts. For example, the migration monitor 110 can subscribe to any detail in the "heartbeat" from the migration controller 105, and any commands sent from the migration monitor 110 can be sent to a certain migration controller 105 or all migration controllers 105 that correspond to a certain customer order.

The use of a service bus as described above is an improvement over sending the heartbeat and other communications through an order database, as there may be less control over such an order database because it may not be designed for changes or it may be an inaccessible third-party database. This may make it difficult to scale to meet the demands of the source system. In other words, the events that could boost the number of migration controllers 105 are directly related to the behavior of end users and system administrators and therefore may not be controlled with a third party interface. It follows that it is advantageous to offload to the service bus any communications that occur with regularity, like the heartbeat and commands to increase or decrease throughput.

D. Order Database

In some embodiments, an order database 120 stores data related to a data migration such as migration order information and end user account data. The order database 120 may be a third party database. The order database 120 may act as an intermediary between the migration controller 105 and the project management application 130. The order database 120 may send notifications to the project management application 130 upon certain events, for example if any data the order database 120 receives from the migration controller 105 indicates that the data migration is not on target to be completed on time, or if a policy has been violated. For example, a notification can be sent by the order database 120 to the project management application 130 if a data migration abruptly slows in volume to a point below a defined minimum in a policy.

E. Elastic Controller

Some embodiments may include an elastic controller 125, which may consist of a database and a workflow (i.e. logic). The elastic controller 125 may monitor the order database 120 and take action based on its workflow. For example, if the elastic controller 125 finds a scheduled data migration in the order database 120, the elastic controller 125 may reserve the migration controller 105 (i.e. one or more servers) as necessary to carry out the migration when needed.

F. Project Management Application

Some embodiments may include a project management application 130, accessible to users via a front end user interface (UI). The project management application 130 may be used to manage and monitor data migrations, and may be web-based or application-based. An administrative UI may be used for administrative access to the project management application 130, for example to allow for additional permissions to manage a migration. The front end interface may include a web interface and/or a mobile interface. See below for more information related to the use of the project management application to manage a data migration.

II. Error Handling

In some embodiments, error messages received from the source server go through one or more rounds of error handling in order to attempt to mitigate them. For example, in a first round of error handling, the migration controller 105 may make certain actions to address item-level errors (i.e. errors that are not systemic to a higher level like an entire mailbox or system), such as retrying the action that originally produced the error message, re-formatting the request, etc. If this does not solve the problem, the error may be noted and the migration may continue, or the error may go through a second level of error handling, where one or more actions may be taken that is applicable to the next highest level, e.g. to the mailbox in an email migration. If those actions fail, the error may then be addressed by the migration monitor, which has information on a more global level, e.g. a migration "order" that includes details about the entire migration. Actions taken at this global level may include reducing concurrency to try to mitigate the errors.

III. Communication Workflow

Figure 2:
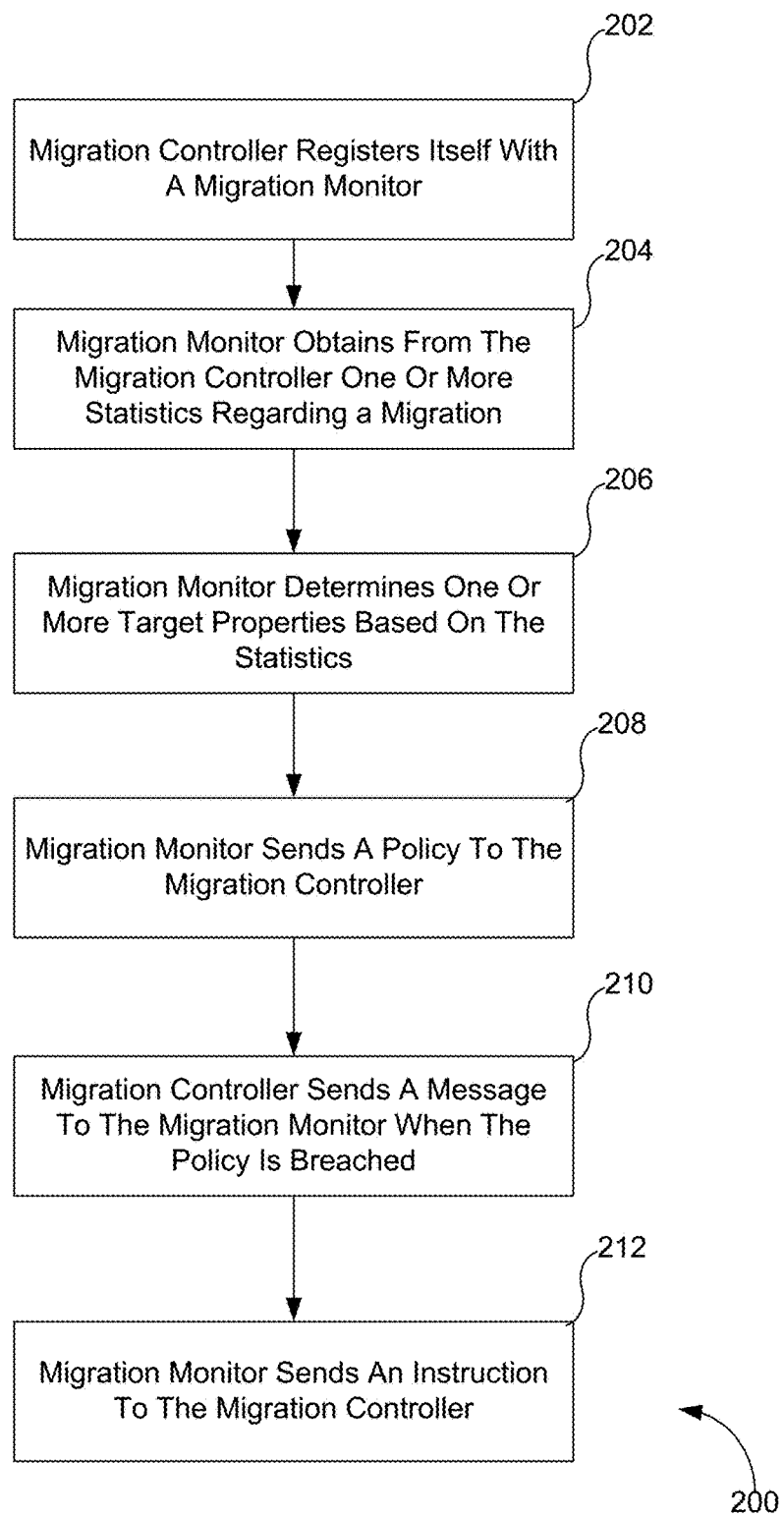
FIG. 2 is a flow diagram of a data migration monitoring workflow according to embodiments.

In some embodiments, communication between the migration controller 105 and migration monitor 110 may occur as shown in FIG. 2.

At block 202, the migration controller 105 can register itself with the migration monitor 110, so that the migration controller 105 can identify itself to the migration monitor 110. This registration is done so that the migration monitor 110 will know that the migration controller 105 is active and should be monitored. The registration at 202 can involve the migration controller 105 sending its identification information, information regarding the migration controlled by the migration controller 105, and/or any other information. The information regarding the migration controlled by the migration controller 105 can include source system information, destination information, a state of the migration between the source and destination system, network information regarding one or more network connections established between the source and destination systems.

At block 204, the migration monitor 110 obtains, from the migration controller 105, one or more statistics regarding the migration. The statistics received at 204 can include a number of network connections currently established between the source and destination systems, load information, CPU usage information, memory usage information, resource usage information, thread information, and/or any other performance information regarding the source and/or the destination systems. For example, the migration controller 105 can periodically send the migration monitor 110 information indicating an average throughput per network connection between the source and destination systems and the number of network connections currently being established between the two.

At block 206, the migration monitor 110 can determine one or more target properties for the migration controlled by the migration controller 105 based on the statistics received at 204. For example, as described and illustrated herein, the migration monitor 110 can be configured to identify a target number of network connections for the migration based on the individual throughputs of all of the network connections between the source and destination systems.

At block 208, the migration monitor 110 can send a policy for the source system to the migration controller 105. As mentioned above, a policy corresponds to data to the migration controller 105 in real-time that directs the migration controller 105 to execute various functions based on a certain set of rules. For example, the policy can include the migration between the source system and destination should have no more than the target number of network connections.

At block 210, if and when the migration controller 105 based the policy (based on one or more error messages that are received), the migration controller 105 sends the error state to the migration monitor 110. Policies can be used to handle errors on the migration controller 105 in different ways. For example, if the count of a specific error type exceeds a certain threshold set by the policy, the migration controller 105 errors may send back a message to the migration monitor 110 indicating a faulted state. Additionally, some error types may be considered to be innocuous to the process and suppressed from further transmission by the policy, while other error types may be singled out by the policy for transmission back the Migration Monitor for additional review.

At block 212, the migration monitor 110 can match the error state with the policy and send the appropriate instructions back to the migration controller 105 to fix the issue. Example instructions may include, but are not limited to: increase concurrency (i.e., increased number of connections), decrease concurrency, or halt the migration.

IV. Determination of Target Number of Network Connections for the Migration

In some embodiments, an average throughput per network connection can be determined and maintained by the migration controller 105 and/or migration monitor 110 as the migration controller 105 continues to measure response time during the migration between source and destinations systems. In some embodiments, the average throughput per connection can be determined by tracking amount of data sent through the network connections and corresponding response times. In some embodiments, the migration controller 105 tracks these values and compute the average throughput per connection based on these values. In those embodiments, the average throughput per network connection can then be continuously sent to the migration monitor 110.

In some embodiments, the migration monitor 110 can be configured to identify a target number of network connections corresponding to a specific change in average throughput per network connection with respect to a change in the number of the network connections. In one example, the average throughput per network connection is plotted as a function of a corresponding number of network connections.

The resulting function can then be used to determine target number of network connections for the migration controller by the migration controller 105, as described in more detail below. In the below calculations, the concept of a "data directory" may be used, where a data directory is a specific collection of data to be migrated, e.g. a data directory can correspond to a mailbox in an email migration.

A. Determining Throughput of a Given Network Connection

A number of different ways can be used to obtain throughput of a given network connection between the source system and destination during the migration. For example, the migration controller 105 can be configured to measure response time for certain amount of data transmitted from the source system to the destination system through the given network connection during the migration. In that example, the migration controller 105 or the migration monitor 110 can be configured to compute the throughput of the given network connection during the migration by dividing the total amount of data sent by the measured response time. Another example of determining the throughput of the given network connection is to dynamically request the source or destination systems to send an amount of data. In that example, the response time for each request can be specifically obtained by the migration controller 105 and the average throughput per network connection can then be computed.

Figure 3:
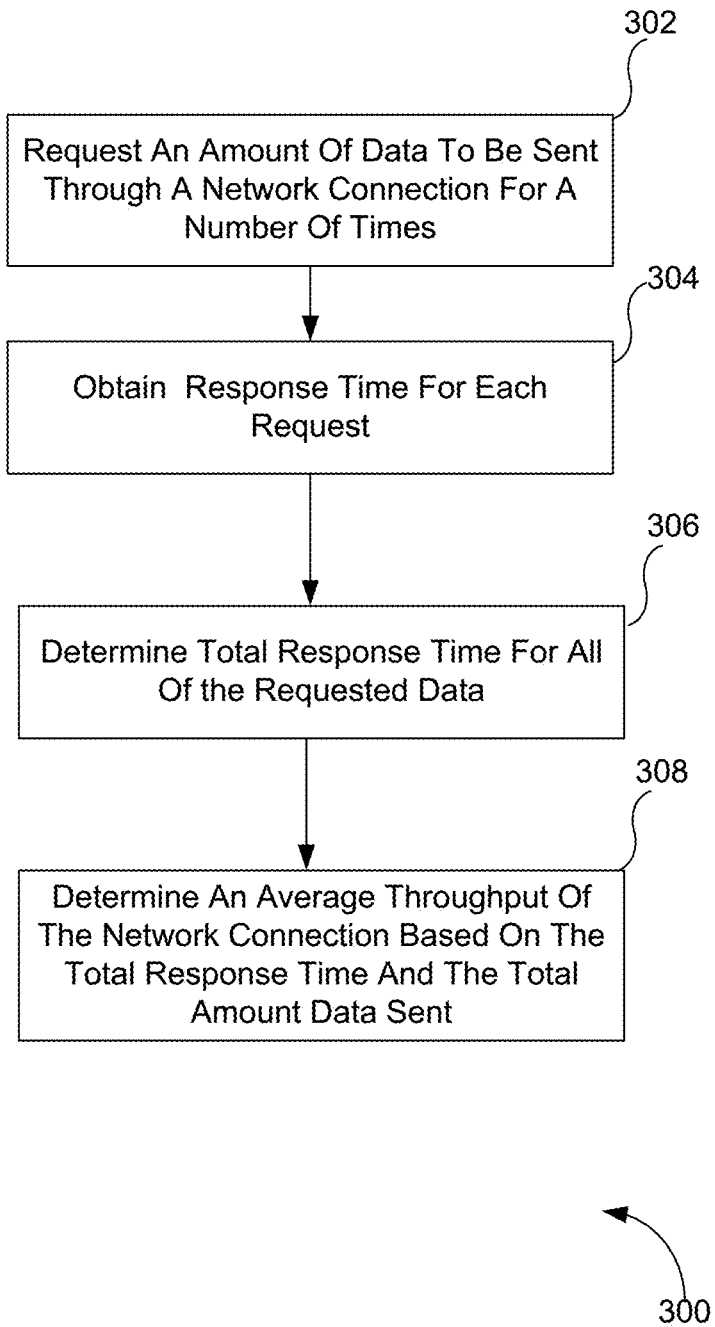
FIG. 3 illustrates an exemplary method for determining a throughput of a given network connection between a source system and destination system in accordance with the disclosure.

FIG. 3 illustrates an exemplary method 300 for determining a throughput of a given network connection between a source system and destination system in accordance with the disclosure. The operations of method 300 presented below are intended to be illustrative. In some embodiments, method 300 may be accomplished with one or more additional operations not described and/or without one or more of the operations discussed. Additionally, the order in which the operations of method 300 are illustrated in FIG. 3 and described below is not intended to be limiting.

In some embodiments, method 300 may be implemented in a migration controller 105 and/or a migration monitor 110, which may each include one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At 302, a number of requests may be generated and sent to the source or the destination system. Each of the requests can request the source or the destination system to send a corresponding amount of data to the other system through a particular network connection during the migration. For example, 5 requests may be sent one after another serially to request the source system to send an amount of data corresponding to each request to the destination system through the given network connection. The amount of data to be sent in each request can be the same across all of the requests or can vary. For example, each of the 5 requests can request the source system to send 1 MB data to the destination system during the migration through the network connection. As another example, the first request can request the source system to send 0.8 MB data to the destination system, the second request can request the source system to send 1 MB data to the destination system, the third request can request the source system to send 1.2 MB data to the destination system, the fourth request can request the source system to send 1.4 MB data to the destination system, and the fifth request can request the source system to send 1.6 MB data to the destination system.

At 304, response time to fulfill each of the requests made in 302 can be obtained. In certain embodiments, the source system and the destination system may keep a record for each request indicating when the requested amount of the data is first sent from the source system and when the requested amount of the data is completely received at the destination system. In those embodiments, the migration controller 105 may be configured to obtain those timestamps to determine the response time for the request. In some other examples, the response times may be measured by the migration controller 105, by starting a timer when the requested data is sent to the source or destination system, and stopping the timer when the requested data is received at the destination or source system.

At 306, total response time for all of the requests made in 302 can be determined. The operations involved in 306 may simply include summing up response time for all of the requests obtained at 304.

At 308, an average throughput of the network connection can be determined based on the total response time determined at 306 and total amount of requested data sent through the network connection. In certain implementations, operations involved in 308 can include dividing the total amount of requested data sent through the network connection by the total response time determined at 306. For example, as illustration, if the total response time obtained at 306 is 4 seconds and the total amount of data requested to be sent at 302 is 10 MB, then the throughput of the network connection is 10 MB/4 seconds=2.5 MB/s.

B. Computing Average Throughput Per Network Connection

In some embodiments, there can be multiple connections between source and destination system for migrating data items in a data directory (e.g. more than one connection per mailbox in an email migration). In those embodiments, an average throughput per connection may be calculated. As will be discussed in the next section, the average throughput per connection can be used to identify a target number of network connections that can be implemented for the migration controlled by the migration controller 105.

Figure 4:
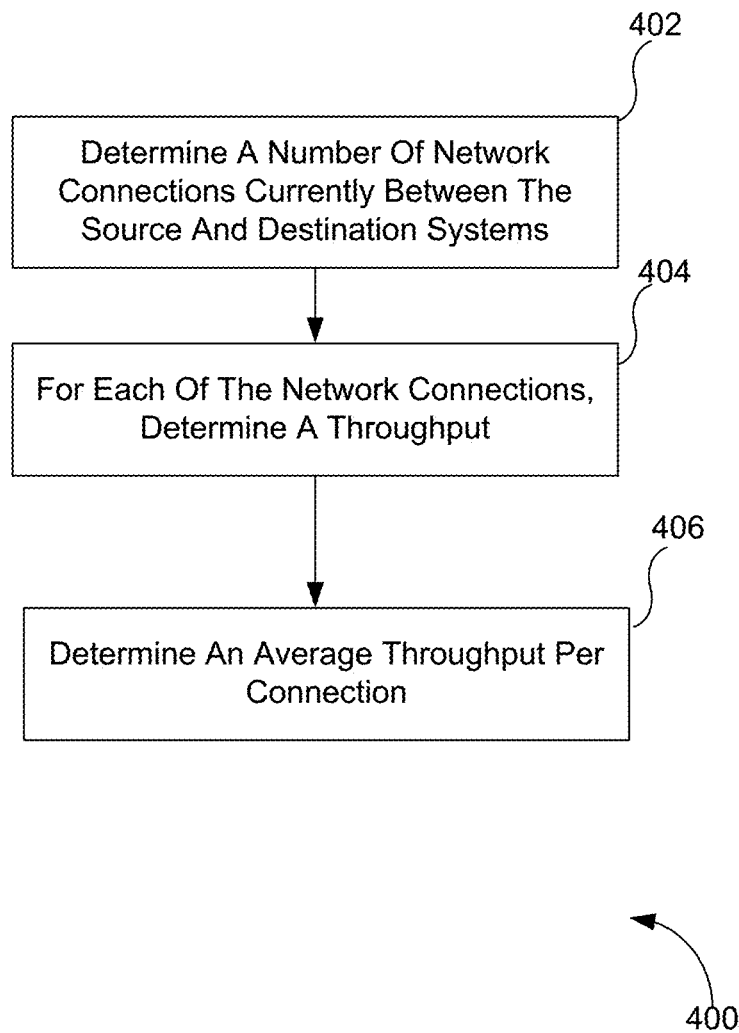
FIG. 4 illustrates an exemplary method for determining an average throughput per network connection between a source system and destination system in accordance with the disclosure.

FIG. 4 illustrates an exemplary method 400 for determining an average throughput per network connection between a source system and destination system in accordance with the disclosure. The operations of method 400 presented below are intended to be illustrative. In some embodiments, method 400 may be accomplished with one or more additional operations not described and/or without one or more of the operations discussed. Additionally, the order in which the operations of method 400 are illustrated in FIG. 3 and described below is not intended to be limiting.

In some embodiments, method 400 may be implemented in a migration controller 105 and/or a migration monitor 110, which may each include one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At 402, the number of network connections currently between the source system and destination system for migrating data items in a data directory can be determined. In certain implementations, operations involved in 402 can include obtaining network connection information from the source system and/or the destination system periodically. The network connection information can indicate a number of network connections currently between the source system and the destination system for facilitating the migration of the data items in the data directory.

At 404, for each of network connections determined at 402, a throughput can be determined. In some implementations, the operations for determining throughput of a given network connection involved in 404 can include steps of method 300 as illustrated in FIG. 3.

At 406, an average throughput per network connection can be determined. In certain implementations, operations involved in 406 can include summing up the throughput of each of the network connections determined at 404 to obtain a combined throughput and dividing the combined throughput by the number of network connections determined at 402. The average throughput per network connection determined at 406 can be paired with the number of the network connections determined at 402 for identifying a target number of network connections that will be discussed in the next section.

V. Identifying a Target Number of Network Connections

In some embodiments, a target number of network connections can be identified. The target of network connections can be determined for migration of a data directory or for the source and/or destination systems. As described above, an average throughput per network connection can be determined. In some embodiments, that determination can be made for migration of the data direction. For example, if 6 network connections are employed for migrating a particular mailbox, then an average throughput per connection for those 6 network connections can be determined for the migration of the mailbox as described above. In some embodiments, that determination can be made for the source system or destination system. For example, if there are 30 network connections between the source and destination systems for migrating 3 mailboxes concurrently, an average throughput per connection for those 30 connections can be determined for the migration between the source and destination systems can be determined.

From a conceptual point of view, the target number of network connections represent a balance between optimal network throughput and concurrency. On the one end, when there is only one network connection for the migration, the throughput for that network connection can be very high, but the total throughput may not be very high. On the other end, where there are many network connections for the migration, the average throughput per connection may be low due to heavy network load on the systems, which may also result in not very high total throughput. Thus, as the number of network connections increase during the migration, the average throughput per connection can increase and then decrease. Under the target number of network connections, a high total throughput of the network connections and as well as good concurrency may be achieved.

Figure 5:
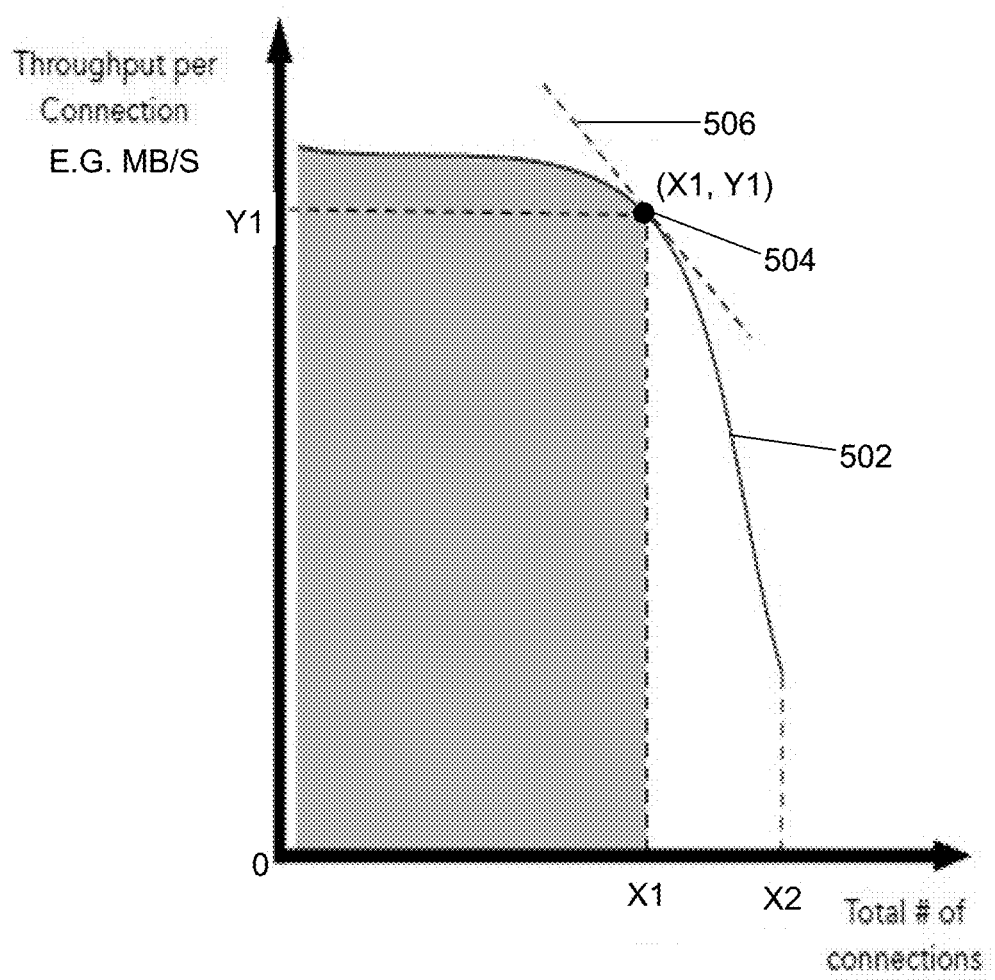
FIG. 5 conceptually illustrates identification of the target number of network connections by plotting a set of average throughput per network connection against corresponding number of network connections.

FIG. 5 conceptually illustrates identification of the target number of network connections by plotting a set of average throughput per network connection against corresponding number of network connections. In some embodiments, the set of average throughput per network connection can be determined using the steps of method 400 shown in FIG. 4. As described above, for each of the average throughput per network connection determined by method 400, a corresponding number of network connections can be obtained. This relationship between the average throughput per network connection and the corresponding number of network connections can then plotted as shown in FIG. 5. That is, a series of points can be plotted in the X-Y coordinate system shown in FIG. 5, wherein the X coordinate of each of the series of the points corresponds to the number of network connections corresponding to each of the average throughputs in the set and the Y coordinate corresponds to the average throughputs per network connection in the set.

A curve 502 may then be fit to the plot and may be used to determine a function of the average throughput per network connection with respect to the quantity of network connections. Using that curve 502, a goal can be to find a target point 504 on the curve 502 representing a specific change in average throughput per connection due to a change in the change in number of connections. In this example, at the target point 504, the curve 502 drops steeply. This indicates change in average throughput per connection after the target point 504 becomes greater than that before the target point 504. In this example, $X_1$ represents a number of network connections between the source and destination systems at certain point in time during the migration, and $Y_1$ represents the average throughput per connection at that point in time during the migration. The shaded area in the graph represents the total throughput of the $X_1$ number of network connections, which represents a maximum total throughput that can be achieved.

In some implementations, the target point 504 can be identified by finding a target slope tangential to the curve 502 at that point. In this example, at the target point, the slope 506 is negative 1. However, this is not intended to be limiting. The target slope 506 can be any desired value.

In some embodiments, the target number of network connections may be set as the local maximum for the policy for the migration. Once the target total number of connections is determined, then it can be set on the migration controller 105 by setting the policy so the migration between the source and destination systems can be implemented using the target number of network connections. For example, if the target number of network connections is determined to be 30 connections, the network connections between the source and destination systems can be reduced to 30 when more than 30 network connections are established between the source and destination system during the migration. As another example, the network connections between the source and destination systems can be increased to 30 (e.g., more connections can be established to migrate additional mailboxes concurrently) when less than 30 network connections are established between the source and destination system during the migration.

In some embodiments, the target total number of connections may be set by the migration monitor 110 and/or the migration controller 105 in real-time, or at certain intervals (e.g. once every 20 seconds, once every 30 minutes, etc.), with the necessary steps repeated as needed to calculate the target total number of connections as described and illustrated herein.

Figure 6:
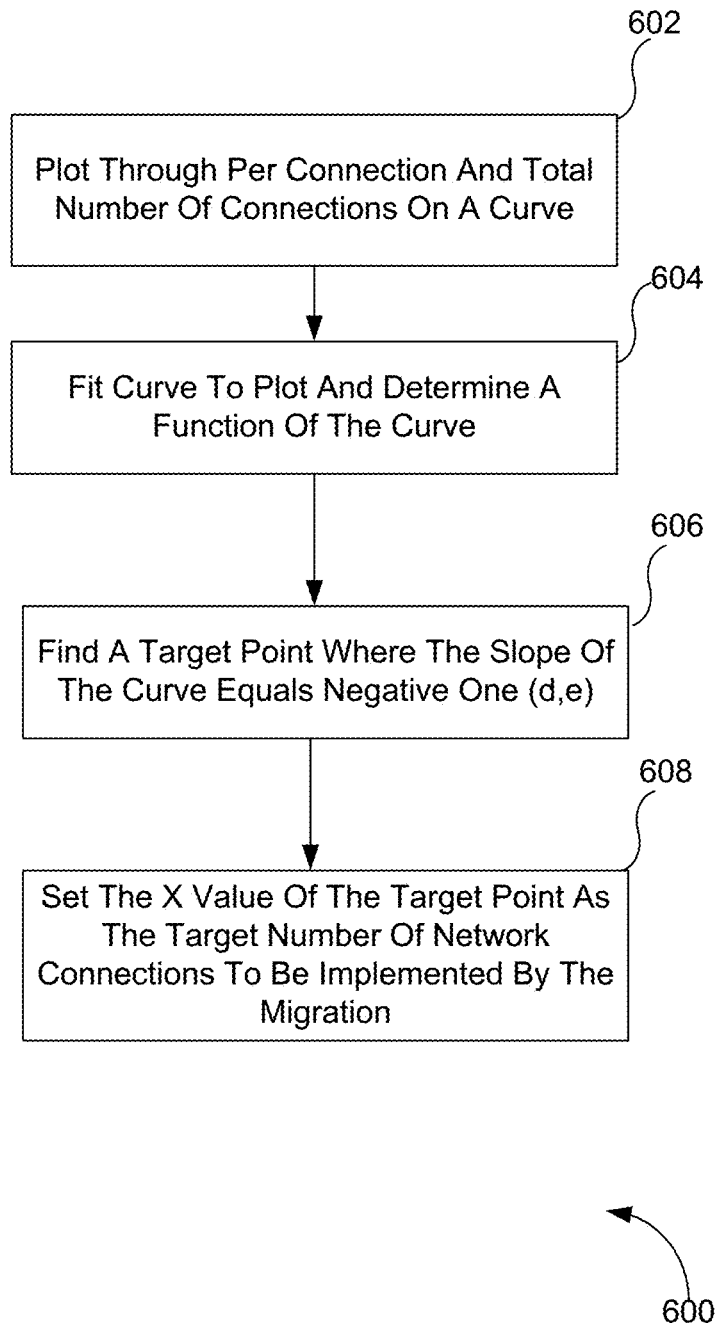
FIG. 6 illustrates an exemplary method for identifying a target number of network connections that can be implemented for the migration between a source and destination systems.

FIG. 6 illustrates an exemplary method 600 for identifying a target number of network connections that can be implemented for the migration between a source and destination systems. The operations of method 600 presented below are intended to be illustrative. In some embodiments, method 600 may be accomplished with one or more additional operations not described and/or without one or more of the operations discussed. Additionally, the order in which the operations of method 600 are illustrated in FIG. 3 and described below is not intended to be limiting.

In some embodiments, method 600 may be implemented in a migration controller 105 and/or a migration monitor 110, which may each include one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

At 602, a set of average throughput per network connections can be plotted against corresponding number of network connections in a X-Y coordinate system. In certain implementations, operations involved in 602 can include plotting a series of points in the X-Y coordinate system, wherein the X coordinate of each of the series of the points corresponds to the number of network connections corresponding to each of the average throughputs in the set and the Y coordinate of each of the series of the points corresponds to the average throughputs per network connection in the set. The plotting does not need to be displayed, and can be accomplished by identifying each of the data points comprised of the average throughput and the number of connections.

At 604, a curve can be fit to the plot done at 602. In certain implementations, operations involved in 604 can include connecting the series points plotted in 602, e.g., with piecewise linear, quadratic, or higher order polynomials. Other functions can be used as well. The fitting can determine variables (coefficients) of the function to which the fit is performed.

At 606, a target point can be identified on the curve done at 604. In certain implementations, the target point can be identified such that the tangential slope of the curve at the target point equals negative one. Other slopes can be used based on the level of degradation per adding a connection that is tolerable. In certain implementations, the target point can identified based on the points on the curve done at 604 before and/or after the target point. For example, the target point can be identified based on the Y direction of the curve. In one embodiment, the target point is identified because the curve decreases most significantly in Y direction at the target point.

At 608, the X value of the target point identified at 606 can set as the target number of network connections to be implemented by the migration between the source and destination systems. In some implementations, the target number of the network connections can be sent to a migration controller the same as or substantially similar to the migration controller 105 for implementation as described and illustrated herein.

VI. User Interface for Server Load Management

Figure 7:
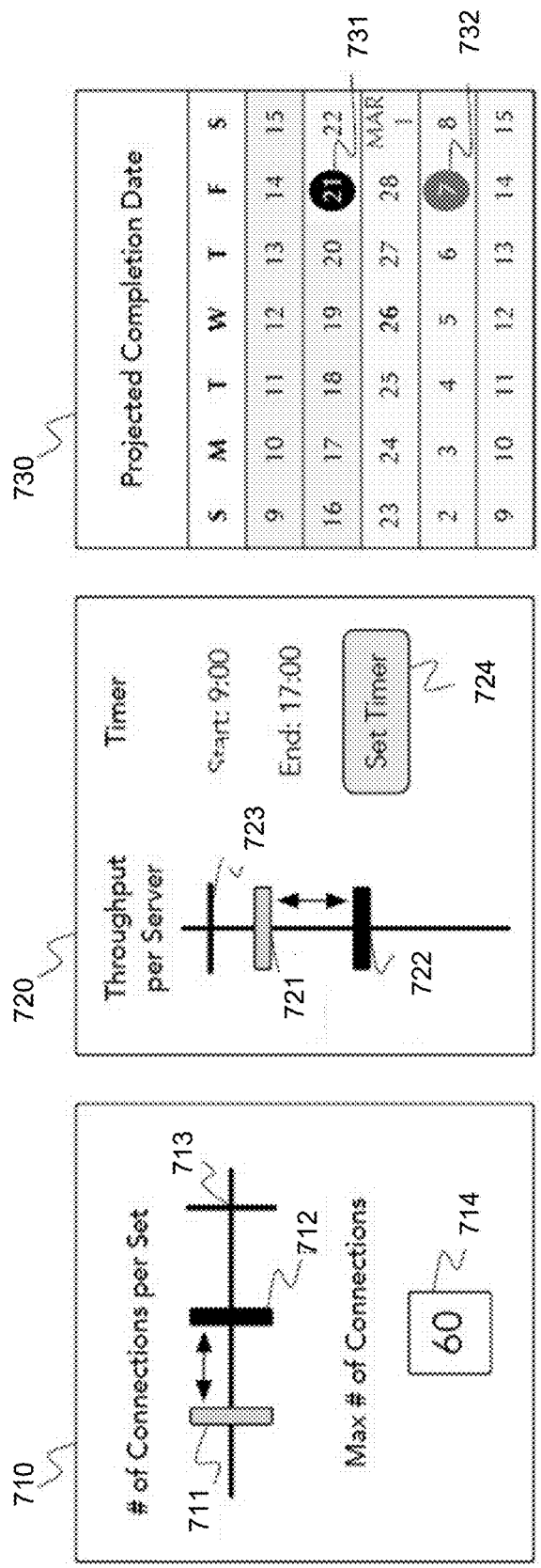
FIG. 7 is a schematic diagram of an example user interface used to manage server load in a data migration according to embodiments.

In some embodiments, a user interface may be used to manage server load for a migration. This user interface may be part of the project management application described above, or it may be the front-facing end of a different application. An example user interface used in some embodiments is shown in FIG. 7; the functionality of the interface is described in be more detail below.

A. Setting Number of Connections

A module 710 may be used to set the number of connections per set. The user may manipulate a slider 711, for example to the right at 712 to increase the number of connections per set, and to the left to decrease the number of connections per set; the number of connections chosen by the user with the slider 711 may be displayed on the module 710. The slider may be bound by an upper limit at 713, for example to a maximum number ($x_4$ on FIG. 6) of connections per mailbox allowed by the email provider for the source system. The target number of connections per server may be displayed at 714, which the user might use for reference when setting the number of connections per set. A maximum number of connections can also be limited by a number of connections per mailbox and a total number of mailboxes to be migrated.

When a user changes the number of connections per set (e.g. the number of connections per mailbox in an email migration), the number of sets migrated concurrently may change. For example, in the case of a maximum of 60 connections per mailbox allowed, an increase in the number of connections per mailbox from 4 to 6 would result in the maximum number of concurrent mailboxes migrating to decrease from 15 to 10, in order to stay at or below the maximum number of connections per set (i.e. mailbox) allowed per order. Changes in the number of migrating sets in reaction to a user changing the number of connections per set may be shown on the user interface. In the example above, for instance, the number of sets (i.e. mailboxes) listed as concurrently migrating on the user interface could decrease from 15 to 10 in reaction to the user increasing the number of connections per set from 4 to 6.

B. Setting Throughput

A module 720 may be used to set the total throughput per server. The user may manipulate a slider 721, for example downwards at 722 to reduce the total throughput per server, or upwards to increase the total throughput per server; the total throughput per server chosen by the user with the slider 721 may be displayed on the module 720. The slider may be bound by an upper limit at 723, for example the target throughput per server as calculated above (and which may be updated dynamically over time). The upper limit may be based on a number of values, for example a theoretical maximum, or target throughput.

A timer 724 may be used to schedule throughput targets based on the time of day. This allows the user to optimize the experience of end users on the source system during certain hours of the day, such as peak business hours. For example, a user could set the total throughput per server to a high level when the least amount of end users of the source system are using the source system, and a lower level when more end users of the source system are using the source system.

In some embodiments, a module 730 may display the start date of a migration at 731, and a projected completion date at 732 based on the server size and average throughout.

VII. Computer System

Figure 8:
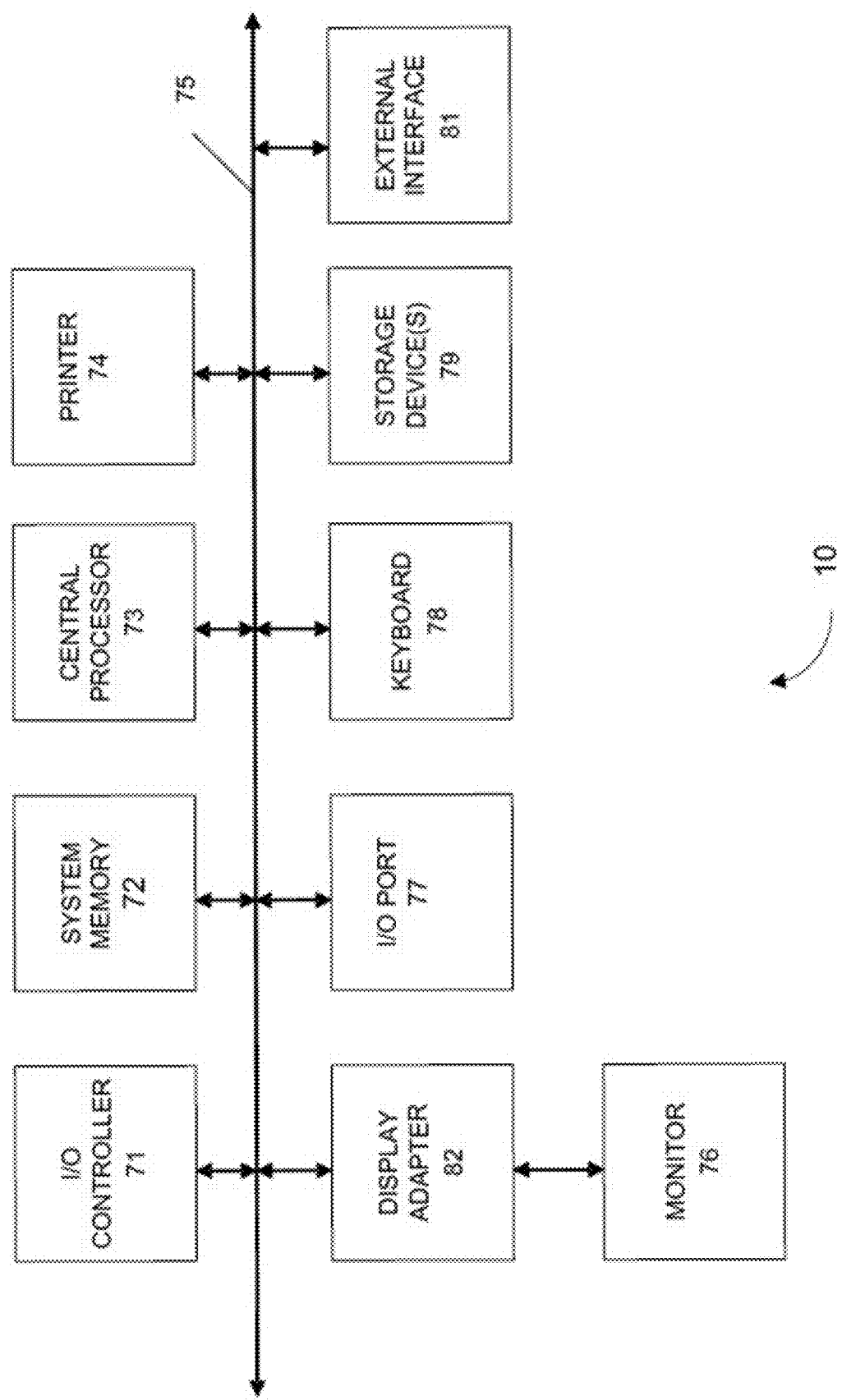
FIG. 8 shows a block diagram of an example computer system 10 usable with systems and methods according to embodiments.

Any of the computer systems mentioned herein may utilize any suitable number of subsystems. Examples of such subsystems are shown in FIG. 8 in computer system 10. In some embodiments, a computer system includes a single computer apparatus, where the subsystems can be the components of the computer apparatus. In other embodiments, a computer system can include multiple computer apparatuses, each being a subsystem, with internal components.

The subsystems shown in FIG. 8 are interconnected via a system bus 75. Additional subsystems such as a printer 74, keyboard 78, storage device(s) 78, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of instructions from system memory 72 or the storage device(s) 78 (e.g., a fixed disk, such as a hard drive or optical disk), as well as the exchange of information between subsystems. The system memory 72 and/or the storage device(s) 78 may embody a computer readable medium. Any of the data mentioned herein can be output from one component to another component and can be output to the user.

A computer system can include a plurality of the same components or subsystems, e.g., connected together by external interface 81 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement various embodiments using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of various embodiments. However, other embodiments may be directed to specific embodiments relating to each individual aspect, or specific combinations of these individual aspects.

The above description of exemplary embodiments has been presented for the purposes of illustration and description. It is not intended to be exhaustive or to limit embodiments to the precise form described, and many modifications and variations are possible in light of the teaching above. The embodiments were chosen and described in order to best explain the principles of some embodiments and their practical applications to thereby enable others skilled in the art to best utilize various embodiments with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned here are incorporated by reference in their entirety for all purposes. None is admitted to be prior art.

What is claimed is:

1. A method for optimizing performance of a source server configured to facilitate migration of data items in a data directory through network connections provided by the source server to a destination server, the method comprising:
   determining a set of average throughputs per network connection provided by the source server for migrating the data items in the data directory to the destination server, each of the average throughputs in the set corresponding to a unique number of network connections provided by the source server, wherein determining an average throughput of a particular number of network connections provided by the source server comprises:
      through the particular number of network connections provided by the source server, sending a number of requests for the source server to process an amount of data;
      for each of the particular number of network connections provided by the source server:

obtaining response time for which the source server processed the amount of data sent through the network connection; and computing a throughput of the network connection based on the response time; and computing an average throughput per network connection for the particular number of network connections by dividing a sum of the throughput of each of the particular number of network connections provided by the source server by the quantity of the particular number of network connections;

identifying a target number of network connections corresponding to a specific change in average throughput per connection based on a change in the number of network connections provided by the source server;

setting the target number of network connections for managing network connections provided by the source server; and implementing, by a migration controller, migration of the data items in the data directory from the source server to the destination system using the target number of network connections.

2. The method of claim 1, wherein the target number of network connections is identified such that a decrease in average throughput per connection is greatest from the target number to target number plus one.

3. The method of claim 1, wherein the amount of the data requested to be processed for each network connection is the same.

4. The method of claim 1, wherein identifying the target number of network connections comprises:

plotting a series of points in a Cartesian coordinate system, wherein the X coordinate of each of the series of the points corresponds to the number of network connections corresponding to each of the average throughputs in the set and the Y coordinate of each of the series of the points corresponds to the average throughputs per network connection in the set;

connecting the series of points to form a curve; and identifying the target number of network connections using the curve.

5. The method of claim 1, wherein identifying the target number of network connections comprises:

determining a function of average throughput per network connection with respect to a quantity of network connections provided by the source server; and fitting the set of average throughputs against the number of network connections corresponding to each of the average throughputs in the set to obtain variables of the function.

6. A system for optimizing performance of a source server configured to facilitate migration of data items in a data directory through network connections provided by the source server to a destination server, the system comprising one or more processors configured to perform:

determining a set of average throughputs per network connection provided by the source server for migrating the data items in the data directory to the destination server, each of the average throughputs in the set corresponding to a unique number of network connections provided by the source server, wherein determining an average throughput of a particular number of network connections provided by the source server comprises:

through the particular number of network connections provided by the source server, sending a number of requests for the source server to process an amount of data;

for each of the particular number of network connections provided by the source server:

obtaining response time for which the source server processed the amount of data sent through the network connection; and computing a throughput of the network connection based on the response time; and computing an average throughput per network connection for the particular number of network connections by dividing a sum of the throughput of each of the particular number of network connections provided by the source server by the quantity of the particular number of network connections;

identifying a target number of network connections corresponding to a specific change in average throughput per connection based on a change in the number of network connections provided by the source server;

setting the target number of network connections for managing network connections provided by the source server; and implementing, by a migration controller, migration of the data items in the data directory from the source server to the destination system using the target number of network connections.

7. The system of claim 6, wherein the target number of network connections is identified such that a decrease in average throughput per connection is greatest from the target number to target number plus one.

8. The system of claim 6, wherein the amount of the data requested to be processed for each network connection is the same.

9. The system of claim 6, wherein identifying the target number of network connections comprises:

plotting a series of points in a Cartesian coordinate system, wherein the X coordinate of each of the series of the points corresponds to the number of network connections corresponding to each of the average throughputs in the set and the Y coordinate of each of the series of the points corresponds to the average throughputs per network connection in the set;

connecting the series of points to form a curve; and identifying the target number of network connections using the curve.

10. The method of claim 6, wherein identifying the target number of network connections comprises:

determining a function of average throughput per network connection with respect to a quantity of network connections provided by the source server; and fitting the set of average throughputs against the number of network connections corresponding to each of the average throughputs in the set to obtain variables of the function.

* * * * *